US012670828B2

(12) United States Patent
Hyun

(10) Patent No.: US 12,670,828 B2
(45) Date of Patent: Jun. 30, 2026

(54) DISPLAY DEVICE AND METHOD OF DRIVING THE SAME

(71) Applicant: SAMSUNG DISPLAY CO., LTD., Yongin-si (KR)

(72) Inventor: Chang Ho Hyun, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/978,692

(22) Filed: Dec. 12, 2024

(65) Prior Publication Data

US 2025/0111815 A1 Apr. 3, 2025

Related U.S. Application Data

(63) Continuation of application No. 18/197,434, filed on May 15, 2023, now Pat. No. 12,190,774.

(30) Foreign Application Priority Data

May 16, 2022 (KR) ........................ 10-2022-0059746

(51) Int. Cl.
*G09G 3/20* (2006.01)
*G09G 3/3233* (2016.01)

(52) U.S. Cl.
CPC ......... *G09G 3/2007* (2013.01); *G09G 3/3233* (2013.01); *G09G 2300/0819* (2013.01); *G09G 2300/0842* (2013.01); *G09G 2320/0233* (2013.01); *G09G 2320/0276* (2013.01); *G09G 2320/0666* (2013.01)

(58) Field of Classification Search
CPC ............... G09G 3/2007; G09G 3/3233; G09G 2300/0819; G09G 2300/0842; G09G 2320/0233; G09G 2320/0276; G09G 2320/0666; G09G 2310/0251; G09G 2320/0271; G09G 2320/0626; G09G 2340/0407; G09G 3/20; G09G 2300/0452; G09G 2310/0243; G09G 2310/0264; G09G 2310/027; G09G 2320/0242; G09G 5/10; G09G 3/3208; H10K 59/12
See application file for complete search history.

(56) References Cited

U.S. PATENT DOCUMENTS 8,427,419 B2 4/2013 Ahn et al.
2020/0118478 A1 4/2020 Pyo et al.
2020/0265779 A1* 8/2020 In .......................... G09G 3/3225
2020/0394964 A1 12/2020 Hyun et al.
2021/0098541 A1* 4/2021 Hei .......................... G06T 7/143
2021/0398473 A1* 12/2021 Ahn .......................... G09G 5/10
2023/0351973 A1* 11/2023 Lee ....................... G09G 3/3266

* cited by examiner

*Primary Examiner* — Sahlu Okebato
(74) *Attorney, Agent, or Firm* — CANTOR COLBURN LLP

(57) ABSTRACT

A display device includes a pixel component including a first pixel area in which pixels are disposed at a first density, and a second pixel area in which the pixels are disposed at a second density less than the first density, and a grayscale compensator which converts input grayscale values for the first pixel area to output grayscale values within a first grayscale range, and converts the input grayscale values for the second pixel area to the output grayscale values within a second grayscale range. An upper limit of the second grayscale range is greater than an upper limit of the first grayscale range.

20 Claims, 9 Drawing Sheets

FIG. 9

| | IGR, IGG, IGB | 255 | 203 | 151 | 87 | 51 | 35 | 23 | 11 | 7 | 1 |
|---|---|---|---|---|---|---|---|---|---|---|---|
| FI1 | GGR | 204 | 162.4 | 120.8 | 69.6 | 40.8 | 28 | 18.4 | 8.8 | 5.6 | 0.8 |
| | GGG | 204 | 162.4 | 120.8 | 69.6 | 40.8 | 28 | 18.4 | 8.8 | 5.6 | 0.8 |
| | GGB | 204 | 162.4 | 120.8 | 69.6 | 40.8 | 28 | 18.4 | 8.8 | 5.6 | 0.8 |
| FI2 | RatioR | 1.94 | 1.93 | 1.94 | 1.97 | 2.00 | 2.03 | 2.03 | 2.03 | 2.03 | 2.03 |
| | RatioG | 1.93 | 1.93 | 1.94 | 1.96 | 1.92 | 1.92 | 1.92 | 1.92 | 1.92 | 1.92 |
| | RatioB | 1.92 | 1.93 | 1.92 | 1.89 | 1.91 | 1.89 | 1.89 | 1.89 | 1.89 | 1.89 |
| FI3 | OGR | 395.10 | 313.16 | 234.61 | 137.09 | 81.79 | 56.82 | 37.34 | 17.86 | 11.36 | 1.62 |
| | OGG | 394.02 | 313.35 | 234.61 | 136.41 | 78.53 | 53.88 | 35.41 | 16.93 | 10.78 | 1.54 |
| | OGB | 392.53 | 313.85 | 231.79 | 131.78 | 78.06 | 52.88 | 34.75 | 16.62 | 10.58 | 1.51 |

DISPLAY DEVICE AND METHOD OF DRIVING THE SAME

The application is a continuation of U.S. patent application Ser. No. 18/197,434, filed on May 15, 2023, which claims priority to Korean patent application number No. 10-2022-0059746, filed on May 16, 2022, and all the benefits accruing therefrom under 35 U.S.C. § 119, the content of which in its entirety is herein incorporated by reference.

BACKGROUND

1. Field

Various embodiments of the disclosure relate to a display device and a method of driving the same.

2. Description of Related Art

With a development of information technology, an importance of a display device, which is a connection medium between a user and information, is being emphasized. Owing to the importance of display devices, a use of various kinds of display devices, such as a liquid crystal display device and an organic light-emitting display device, is being increased.

SUMMARY

In display devices, even when identical grayscale values are inputted to pixel areas, the pixel areas may display images having different luminances depending on arrangement of pixels in the pixel areas.

Various embodiments of the disclosure are directed to a display device and a method of driving the display device, in which pixel areas which differ in layout of pixels from each other may emit light at the same luminance on the same input grayscale values.

An embodiment of the disclosure may provide a display device including a pixel component including a first pixel area in which first pixels are disposed at a first density, and a second pixel area in which second pixels are disposed at a second density lower than the first density, and a grayscale compensator which converts input grayscale values for the first pixel area to output grayscale values within a first grayscale range, and converts the input grayscale values for the second pixel area to the output grayscale values within a second grayscale range. An upper limit of the second grayscale range is greater than an upper limit of the first grayscale range.

In an embodiment, the grayscale compensator may include a gain applicator which applies a gain to the input grayscale values and generates gain-applied grayscale values lower than the input grayscale values.

In an embodiment, the grayscale compensator may further include an area discriminator which determines whether the gain-applied grayscale values are grayscale values corresponding to the first pixel area or grayscale values corresponding to the second pixel area.

In an embodiment, the grayscale compensator may further include a look-up table which defines a relationship between the output grayscale values and the gain-applied grayscale values.

In an embodiment, the grayscale compensator may provide the output grayscale values identical to the gain-applied grayscale values in the case in which the gain-applied grayscale values correspond to the first pixel area, and provide the output grayscale values based on the look-up table in the case in which the gain-applied grayscale values correspond to the second pixel area.

In an embodiment, the input grayscale values may include first input grayscale values for a first color, second input grayscale values for a second color, and third input grayscale values for a third color. The gain applicator may apply an identical gain to the first input grayscale values, the second input grayscale values, and the third input grayscale values.

In an embodiment, the gain-applied grayscale values may include first gain-applied grayscale values for the first color, second gain-applied grayscale values for the second color, and third gain-applied grayscale values for the third color. The output grayscale values may include first output grayscale values for the first color, second output grayscale values for the second color, and third output grayscale values for the third color. The look-up table may define the first output grayscale values for the first gain-applied grayscale values, the second output grayscale values for the second gain-applied grayscale values, and the third output grayscale values for the third gain-applied grayscale values. The first output grayscale values, the second output grayscale values and the third output grayscale values may be different from each other.

In an embodiment, the look-up table may define the output grayscale values only for input-defined grayscale values that are a portion of the gain-applied grayscale values. The grayscale compensator may generate the output grayscale values for the gain-applied grayscale values other than the input-defined grayscale scale values by performing an interpolation operation using the look-up table.

In an embodiment, the display device may further include a grayscale voltage generator which provides grayscale voltages corresponding to the output grayscale values. The grayscale voltages may include reference grayscale voltages for reference grayscale values, and divided grayscale voltages generated by dividing the reference grayscale voltages.

In an embodiment, the input-defined grayscale values of the look-up table may correspond to the reference grayscale values.

An embodiment of the disclosure may provide a method of driving a display device including a pixel component having a first pixel area in which first pixels are disposed at a first density, and a second pixel area in which second pixels are disposed at a second density lower than the first density. The method may include converting input grayscale values for the first pixel area to output grayscale values within a first grayscale range, and converting the input grayscale values for the second pixel area to the output grayscale values within a second grayscale range. An upper limit of the second grayscale range may be greater than an upper limit of the first grayscale range.

In an embodiment, the method may further include generating gain-applied grayscale values lower than the input grayscale values by applying a gain to the input grayscale values.

In an embodiment, the method may further include determining whether the gain-applied grayscale values are grayscale values corresponding to the first pixel area or grayscale values corresponding to the second pixel area.

In an embodiment, the display device may further include a look-up table which defines a relationship between the output grayscale values and the gain-applied grayscale values.

In an embodiment, the method may further include providing the output grayscale values identical to the gain-applied grayscale values in a case in which the gain-applied grayscale values correspond to the first pixel area, and providing the output grayscale values based on the look-up table in a case in which the gain-applied grayscale values correspond to the second pixel area.

In an embodiment, the input grayscale values may include first input grayscale values for a first color, second input grayscale values for a second color, and third input grayscale values for a third color. An identical gain may be applied to the first input grayscale values, the second input grayscale values, and the third input grayscale values.

In an embodiment, the gain-applied grayscale values may include first gain-applied grayscale values for the first color, second gain-applied grayscale values for the second color, and third gain-applied grayscale values for the third color. The output grayscale values may include first output grayscale values for the first color, second output grayscale values for the second color, and third output grayscale values for the third color. The look-up table may define the first output grayscale values for the first gain-applied grayscale values, the second output grayscale values for the second gain-applied grayscale values, and the third output grayscale values for the third gain-applied grayscale values. The first output grayscale values, the second output grayscale values and the third output grayscale values may be different from each other.

In an embodiment, the look-up table may define the output grayscale values only for input-defined grayscale values that are a portion of the gain-applied grayscale values. The method may further include generating the output grayscale values for the gain-applied grayscale values other than the input-defined grayscale scale values by performing an interpolation operation using the look-up table.

In an embodiment, the display device may further include a grayscale voltage generator which provides grayscale voltages corresponding to the output grayscale values. The grayscale voltages may include reference grayscale voltages for reference grayscale values, and divided grayscale voltages generated by dividing the reference grayscale voltages.

In an embodiment, the input-defined grayscale values of the look-up table may correspond to the reference grayscale values.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 9 is a diagram for describing an embodiment of a look-up table in accordance with the disclosure.

DETAILED DESCRIPTION

Figure 1:
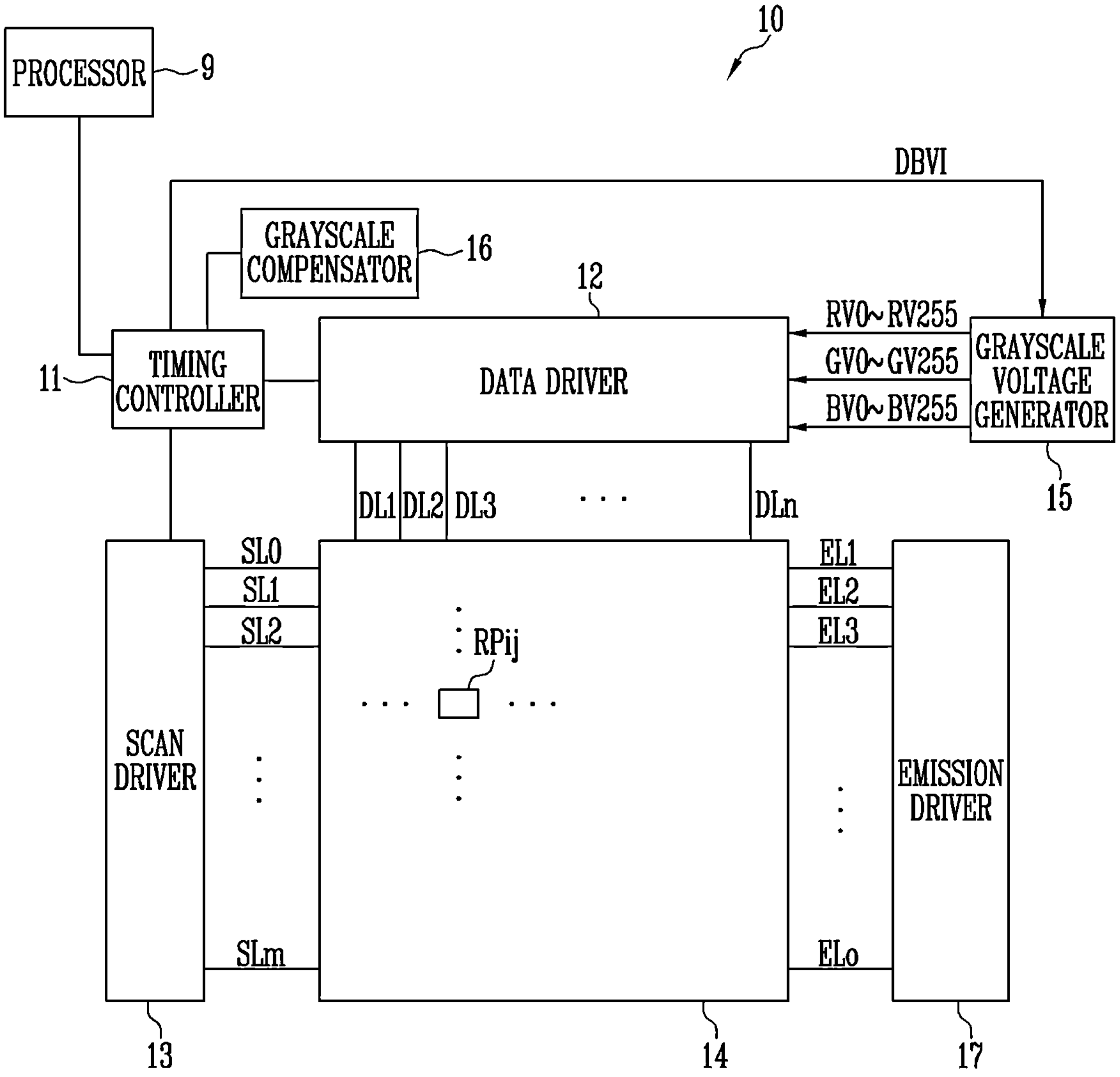
FIG. 1 is a diagram for describing an embodiment of a display device in accordance with the disclosure.

Hereinafter, embodiments of the invention will be described in detail with reference to the attached drawings, such that those skilled in the art may easily implement the invention. The disclosure may be implemented in various forms, and is not limited to the embodiments to be described herein below.

In the drawings, portions which are not related to the disclosure will be omitted in order to explain the disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the disclosure is not limited to what is illustrated in the drawings. In the drawings, the thicknesses of the components may be exaggerated to clearly depict multiple layers and areas.

Furthermore, the expression "being the same" may mean "being substantially the same". In other words, the expression "being the same" may include a range that may be tolerated by those skilled in the art. The other expressions may also be expressions from which "substantially" has been omitted.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a diagram for describing an embodiment of a display device 10 in accordance with the disclosure.

Referring to FIG. 1, the display device 10 in an embodiment of the disclosure may include a processor 9, a timing controller 11, a data driver 12, a scan driver 13, a pixel component 14, a grayscale voltage generator 15, a grayscale compensator 16, and an emission driver 17.

The processor 9 may provide input grayscale values and control signals for an image frame. The processor 9 may be an application processor, a central processing unit ("CPU"), a graphics processing unit ("GPU"), or the like. The input grayscale values may include first input grayscale values for a first color, second input grayscale values for a second color, and third input grayscale values for a third color.

The timing controller 11 may receive input grayscale values and control signals for an image frame from the processor 9. The grayscale compensator 16 may convert the input grayscale values to output grayscale values.

The timing controller 11 may provide the output grayscale values and the control signals to the data driver 12. Furthermore, the timing controller 11 may provide a clock signal, a scan start signal, or the like to the scan driver 13. The timing controller 11 may provide a clock signal, an emission stop signal, or the like to the emission driver 17.

The data driver 12 may generate data voltages to be provided to data lines DL1, DL2, DL3, . . . , DLn using the output grayscale values and the control signals that are received from the timing controller 11. Here, n is an integer greater than 0. In an embodiment, the data driver 12 may sample the output grayscale values using a clock signal, and apply data voltages corresponding to the output grayscale values to the data lines DL1 to DLn on a pixel row basis, for example. Here, the data voltages may correspond to grayscale voltages RV0 to RV255, GV0 to GV255, and BV0 to BV255 provided from the grayscale voltage generator 15. In an embodiment, the data driver 12 may include buffers, for example. Output terminals of the buffers may be connected to the pixels through the data lines. The data driver 12 may apply grayscale voltages corresponding to the output grayscale values of the pixels to the input terminals of the buffers.

The scan driver 13 may receive a clock signal, a scan start signal, or the like from the timing controller 11, and generate scan signals to be provided to the scan lines SL0, SL1, SL2, . . . , SLm. In an embodiment, the scan driver 13 may sequentially supply scan signals each having a turn-on level pulse to the scan lines SL1 to SLm, for example. Here, m is an integer greater than 0. In an embodiment, the scan driver 13 may be configured in the form of a shift register, and may generate scan signals in such a way that a pulse-type scan start signal having a turn-on level is sequentially transmitted to a subsequent stage circuit under the control of a clock signal, for example.

The emission driver 17 may receive a clock signal, and an emission stop signal, or the like from the timing controller 11 and generate emission signals to be provided to emission lines EL1, EL2, EL3, . . . , ELo. Here, o is an integer greater than 0. In an embodiment, the emission driver 17 may sequentially supply emission signals each having a turn-off level pulse to the emission lines EL1 to ELo, for example. In an embodiment, the emission driver 17 may be configured in the form of a shift register, and may generate emission signals in such a way that a pulse-type emission stop signal having a turn-off level is sequentially transmitted to a subsequent stage circuit under the control of a clock signal, for example. Here, o is an integer greater than 0. In the illustrated embodiment, the data driver 12, the scan driver 13 and the emission driver 17 are disposed at upper, left and right sides of the pixel component 14, respectively, but the disclosure is not limited thereto, and in another embodiment, the data driver 12, the scan driver 13 and the emission driver 17 may be disposed at different sides of the pixel component 14. In an embodiment, at least two of the data driver 12, the scan driver 13 and the emission driver 17 may be disposed at the same side of the pixel component 14, for example.

The pixel component 14 includes pixels. Each pixel RPij may be connected to a corresponding data line, a corresponding scan line, and a corresponding emission line. Here, i and j each may be an integer greater than 0. The pixel RPij may refer to a pixel, a scan transistor of which is connected to an i-th scan line and a j-th data line.

The pixel component 14 may include pixels which emit a first color of light, pixels which emit a second color of light, and pixels which emit a third color of light. The first color, the second color, and the third color may be different colors from each other. In an embodiment, the first color may be one of red, green, and blue, for example. The second color may be one of red, green, and blue, other than the first color. The third color may be the remaining color among the red, green, and blue, other than the first color and the second color.

Furthermore, in lieu of red, green, and blue, magenta, cyan, and yellow may be used as the first to third colors. However, the disclosure is not limited thereto, and the first to third colors may include various other colors. In an embodiment, for the convenience of description, it is assumed that the first color is red, the second color is green, and the third color is blue.

The pixel component 14 may have various pixel arrangement structures such as a diamond PENTILE™ structure, an RGB-stripe structure, a S-stripe structure, a real RGB structure, and a normal PENTILE™ structure.

Hereinafter, the position of the pixel RPij will be described based on the position of the corresponding light-emitting diode (particularly, a light-emitting layer). The position of the pixel circuit connected to each light-emitting diode may not correspond to the position of the light-emitting diode. The pixel circuit may be disposed at an appropriate position in the display device 10, taking into account space efficiency.

The grayscale voltage generator 15 may receive a maximum input luminance value DBVI, and provide, in response to the maximum input luminance value DBVI, grayscale voltages RV0 to RV255 for the pixels pertaining to the first color, grayscale voltages GV0 to GV255 for the pixels pertaining to the second color, and grayscale voltages BV0 to BV255 for the pixels pertaining to the third color.

Hereinafter, although for the convenience of explanation there will be described an embodiment in which the input grayscale values include a total of 256 grayscale values ranging from grayscale value 0 (a minimum grayscale value) to grayscale value 255 (a maximum grayscale value), the number of grayscale values may be increased when the grayscale values are represented with 8 or more bits. The minimum grayscale value may refer to a darkest grayscale level. The maximum grayscale value may refer to a brightest grayscale level.

The maximum luminance value may be a luminance value of light emitted from the pixels in response to the maximum grayscale value. In an embodiment, the maximum luminance value may be a luminance value of white light generated when, among pixels that form each dot, a pixel pertaining to the first color emits light in response to grayscale value 255, a pixel pertaining to the second color emits light in response to grayscale value 255, and a pixel pertaining to the third color emits light in response to grayscale value 255, for example. The unit of the luminance value may be a nit.

Therefore, the pixel component 14 may display a partially (spatially) dark or bright image frame, and the maximum brightness of the image frame is limited to the maximum luminance value. The maximum luminance value may be passively set by manipulation of a user of the display device 10, or may be automatically set by an algorithm related to an illuminance sensor or the like. Here, the set maximum luminance value may be also referred to as a maximum input luminance value.

In an embodiment, a maximum value of the maximum luminance value may be about 1200 nits, and a minimum value thereof may be about 4 nits, for example, but the disclosure is not limited thereto, and the maximum luminance value and the minimum luminance value may be changed depending on products. When the maximum input luminance value DBVI varies even when the input grayscale value is the same, the grayscale voltage generator 15 may provide different grayscale voltages RV0 to RV255, GV0 to GV255, and BV0 to BV255, so that the emission luminance of the pixel may vary.

In the foregoing embodiment, there is illustrated an embodiment in which the grayscale compensator 16 is provided separately from the timing controller 11. However, in an embodiment, a portion or the entirety of the grayscale compensator 16 may be integrally provided with the timing controller 11. In an embodiment, a portion or the entirety of the grayscale compensator 16, along with the timing controller 11, may be configured in the form of an integrated circuit, for example. In an embodiment, a portion or the entirety of the grayscale compensator 16 may be implemented as software in the timing controller 11. In an embodiment, a portion or the entirety of the grayscale compensator 16, along with the data driver 12, may be configured in the form of an integrated circuit. In an embodiment, a portion or the entirety of the grayscale compensator 16 may be implemented as software in the data driver 12. In an embodiment, a portion or the entirety of the grayscale compensator 16, along with the processor 9, may be configured in the form of an integrated circuit. In an embodiment, a portion or the entirety of the grayscale compensator 16 may be implemented as software in the processor 9.

Figure 2:
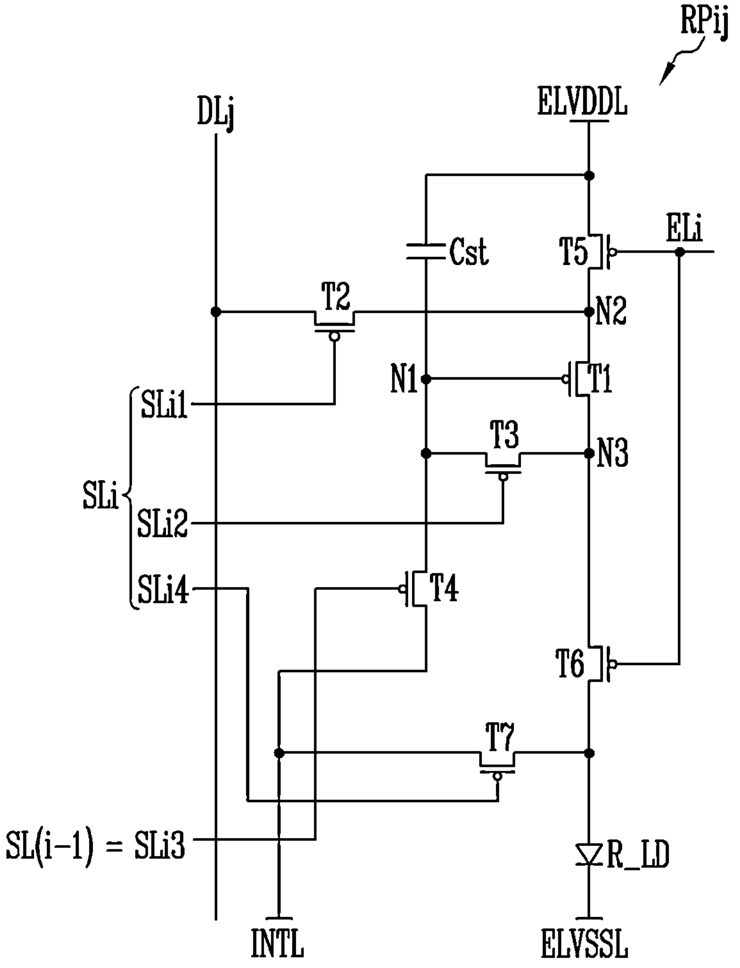
FIG. 2 is a diagram for describing an embodiment of a pixel in accordance with the disclosure.

FIG. 2 is a diagram for describing an embodiment of a pixel RPij in accordance with the disclosure.

Referring to FIG. 2, the pixel RPij includes transistors T1, T2, T3, T4, T5, T6, and T7, a storage capacitor Cst, and a light-emitting element R_LD. In FIG. 2, description will be made on the assumption that the pixel RPij is a first color pixel. The same description may also be applied to a second color pixel and a third color pixel.

Hereinafter, a circuit configured of P-type transistors will be described by way of example. However, those skilled in the art may design a circuit configured of N-type transistors by changing the polarity of the voltage to be applied to a gate terminal of each transistor. Likewise, those skilled in this art may design a circuit configured of a combination of a P-type transistor and an N-type transistor. The term "P-type transistor" is a general name for transistors in which the amount of current increases when a voltage difference between a gate electrode and a source electrode increases in a negative direction. The term "N-type transistor" is a general name for transistors in which the amount of current increases when a voltage difference between a gate electrode and a source electrode increases in a positive direction. Each transistor may be configured in various forms such as a thin film transistor ("TFT"), a field effect transistor ("FET"), or a bipolar junction transistor ("BJT").

The first transistor T1 may include a gate electrode connected to a first node N1, a first electrode connected to a second node N2, and a second electrode connected to a third node N3. The first transistor T1 may be also referred to as a driving transistor.

The second transistor T2 may include a gate electrode connected to a scan line SLi1, a first electrode connected to a data line DLj, and a second electrode connected to the second node N2. The second transistor T2 may be also referred to as a scan transistor.

The third transistor T3 may include a gate electrode connected to a scan line SLi2, a first electrode connected to the first node N1, and a second electrode connected to the third node N3. The third transistor T3 may be also referred to as a diode connection transistor.

The fourth transistor T4 may include a gate electrode connected to a scan line SLi3, a first electrode connected to the first node N1, and a second electrode connected to an initialization line INTL. The fourth transistor T4 may be also referred to as a gate initialization transistor.

The fifth transistor T5 may include a gate electrode connected to an i-th emission line ELi, a first electrode connected to a first power line ELVDDL, and a second electrode connected to the node N2. The fifth transistor T5 may be also referred to as an emission transistor. In an embodiment, the gate electrode of the fifth transistor T5 may be connected to an emission line different from the emission line to which a gate electrode of the sixth transistor T6 is connected.

The sixth transistor T6 may include the gate electrode connected to the i-th emission line ELi, a first electrode connected to the third node N3, and a second electrode connected to an anode of the light-emitting element R_LD. The sixth transistor T6 may be also referred to as an emission transistor. In an embodiment, the gate electrode of the sixth transistor T6 may be connected to an emission line different from the emission line to which a gate electrode of the fifth transistor T5 is connected.

The seventh transistor T7 may include a gate electrode connected to a scan line SLi4, a first electrode connected to the initialization line INTL, and a second electrode connected to the anode of the light-emitting element R_LD. The seventh transistor T7 may be also referred to as a light-emitting-element initialization transistor.

The storage capacitor Cst may include a first electrode connected to the first power line ELVDDL, and a second electrode connected to the first node N1.

The light-emitting element R_LD may include the anode connected to the second electrode of the sixth transistor T6, and a cathode connected to a second power line ELVSSL. The light-emitting element R_LD may be a light-emitting diode. The light-emitting element R_LD may include an organic light-emitting diode, an inorganic light-emitting diode, a quantum dot/well light-emitting diode, or the like. Because it is assumed that the pixel RPij of FIG. 2 is a red pixel, the light-emitting element R_LD may emit a first color (red) of light. Each of the pixels pertaining to other colors (e.g., green and blue) may include a light-emitting element suitable for the corresponding color. Although in the illustrated embodiment only one light-emitting element R_LD is provided in each pixel, a plurality of light-emitting elements may be provided in each pixel in another embodiment. Here, the plurality of light-emitting elements may be connected in series, parallel, or series-parallel to each other.

A first power voltage may be applied to the first power line ELVDDL. A second power voltage may be applied to the second power line ELVSSL. An initialization voltage may be applied to the initialization line INTL. In an embodiment, the first power voltage may be greater than the second power voltage, for example. In an embodiment, the initialization voltage may be the same as or greater than the second power voltage, for example. In an embodiment, the initialization voltage may correspond to the lowest data voltage among data voltages that may be provided, for example. In an embodiment, the magnitude of the initialization voltage may be lower than the magnitudes of the data voltages that may be provided, for example. In the illustrated embodiments, the pixel RPij includes seven transistors and one capacitor, but the disclosure is not limited thereto, and in another embodiment, the number of the transistor may be greater or less than seven, and the number of the capacitor may be greater than one.

Figure 3:
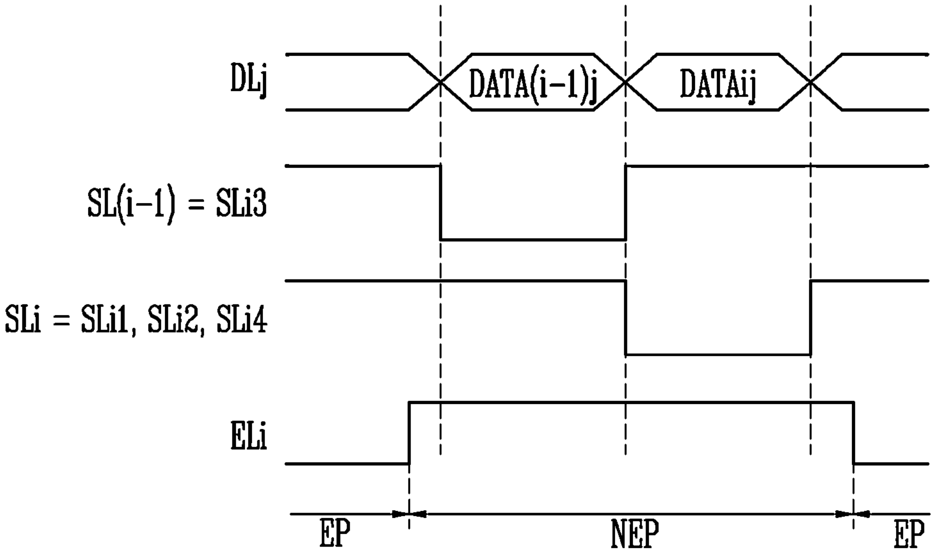
FIG. 3 is a diagram for describing an embodiment of a method of driving the pixel of FIG. 2.

FIG. 3 is a diagram for describing an embodiment of a method of driving the pixel of FIG. 2.

Hereinafter, for convenience of explanation, it is assumed that each of the scan lines SLi1, SLi2, and SLi4 is an i-th scan line SLi, and that the scan line SLi3 is an i−1-th scan line SL(i−1). Here, connection relationships between the scan lines SLi1, SLi2, SLi3, and SLi4 may be changed in various ways depending on the embodiments. In an embodiment, the scan line SLi4 may be an i−1-th scan line or an i+1-th scan line, for example.

First, an emission signal having a turn-off level (a logic high level) may be applied to the i-th emission line Eli. A data voltage DATA (i−1)j for an i−1-th pixel may be applied to the data line DLj. A scan signal having a turn-on level (a logic low level) may be applied to the scan line SLi3. Whether the logic level is high or low may be changed depending on whether the transistor is a P-type or an N-type.

Here, because a scan signal having a turn-off level is applied to the scan lines SLi1 and SLi2, the second transistor T2 is turned off, so that the data voltage DATA (i−1)j for the i−1-th pixel may be prevented from being drawn into the pixel RPij.

Here, because the fourth transistor T4 is turned on, the first node N1 is connected to the initialization line INTL, and the voltage of the first node N1 is initialized. Because an emission signal having a turn-off level is applied to the emission line ELi, the transistors T5 and T6 are turned off, and the light-emitting element R_LD may be prevented from being unnecessarily operated during an initialization voltage application process.

Next, a data voltage DATAij for the i-th pixel RPij is applied to the data line DLj, and a scan signal having a turn-on level is applied to the scan lines SLi1 and SLi2. Hence, the transistors T2, T1, and T3 enter a state capable of conducting electricity, and the data line DLj and the first node N1 are electrically connected to each other. Therefore, a compensation voltage obtained by subtracting a threshold voltage of the first transistor T1 from the data voltage DATAij is applied to the second electrode (i.e., the first node N1) of the storage capacitor Cst. The storage capacitor Cst may maintain a voltage corresponding to the difference between the first power voltage and the compensation voltage. This period may be also referred to as a threshold voltage compensation period or a data write period.

Furthermore, in the case in which the scan line SLi4 is an i-th scan line, the seventh transistor T7 is turned on, so that the anode of the light-emitting element R_LD and the initialization line INTL may be connected and the light-emitting element R_LD may be initialized to the amount of charges corresponding to the difference between the initialization voltage and the second power voltage.

Thereafter, as an emission signal having a turn-on level is applied to the i-th emission line Eli, the transistors T5 and T6 may conduct electricity. Therefore, a driving current path that connects the first power line ELVDDL, the fifth transistor T5, the first transistor T1, the sixth transistor T6, the light-emitting element R_LD, and the second power line ELVSSL may be formed.

The amount of driving current that flows through the first electrode and the second electrode of the first transistor T1 may be adjusted in response to the voltage maintained in the storage capacitor Cst. The light-emitting element R_LD may emit light at a luminance corresponding to the amount of driving current. The light-emitting element R_LD may emit light until an emission signal having a turn-off level is applied to the emission line ELi.

When the emission signal is at a turn-on level, pixels that receive the corresponding emission signal may be in a display state. Therefore, the period during which the emission signal is at a turn-on level may be also referred to as an emission period EP (or an emission enable period). Furthermore, when the emission signal is at a turn-off level, pixels that receive the corresponding emission signal may be in a non-display state. Therefore, the period during which the emission signal is at a turn-off level may be also referred to as a non-emission period NEP (or an emission inhibit period).

The non-emission period NEP described with reference to FIG. 3 may be for preventing the pixel RPij from emitting light at an undesired luminance during the initialization period and the data write period.

While data written in the pixel RPij is maintained (e.g., during one frame period), one or more non-emission periods NEP may be added. The reason for this is because of the fact that, as the emission period EP of the pixel RPij is reduced, low gray scales may be effectively represented, or motion in an image may be smoothly blur-processed.

Figure 4:
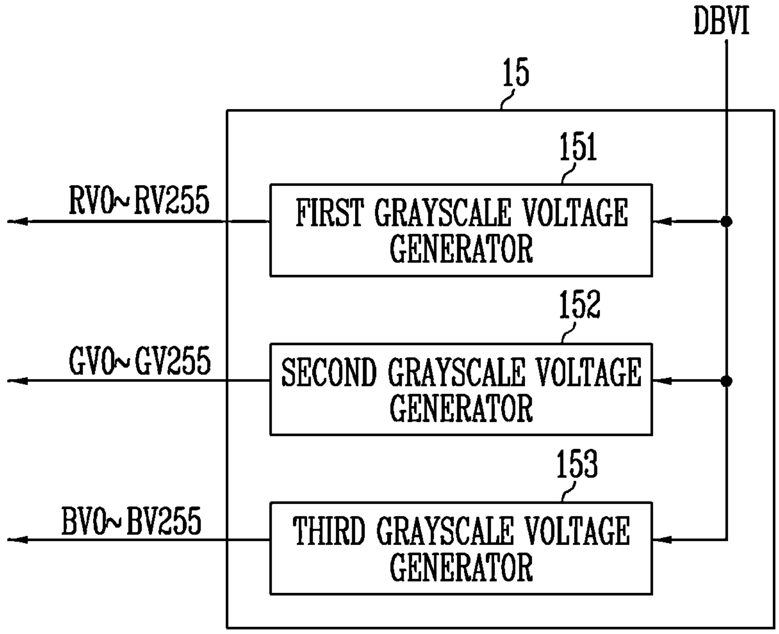
FIG. 4 is a diagram for describing an embodiment of a grayscale voltage generator in accordance with the disclosure.

FIG. 4 is a diagram for describing an embodiment of the grayscale voltage generator 15 in accordance with the disclosure. The grayscale voltage generator 15 may include a first grayscale voltage generator 151, a second grayscale voltage generator 152, and a third grayscale voltage generator 153.

The first grayscale voltage generator 151 may receive a maximum input luminance value DBVI and provide grayscale voltages RV0 to RV255 for the first color pixels in response to the maximum input luminance value DBVI.

The second grayscale voltage generator 152 may receive the maximum input luminance value DBVI and provide grayscale voltages GV0 to GV255 for the second color pixels in response to the maximum input luminance value DBVI.

The third grayscale voltage generator 153 may receive the maximum input luminance value DBVI and provide grayscale voltages BV0 to BV255 for the third color pixels in response to the maximum input luminance value DBVI.

Figure 5:
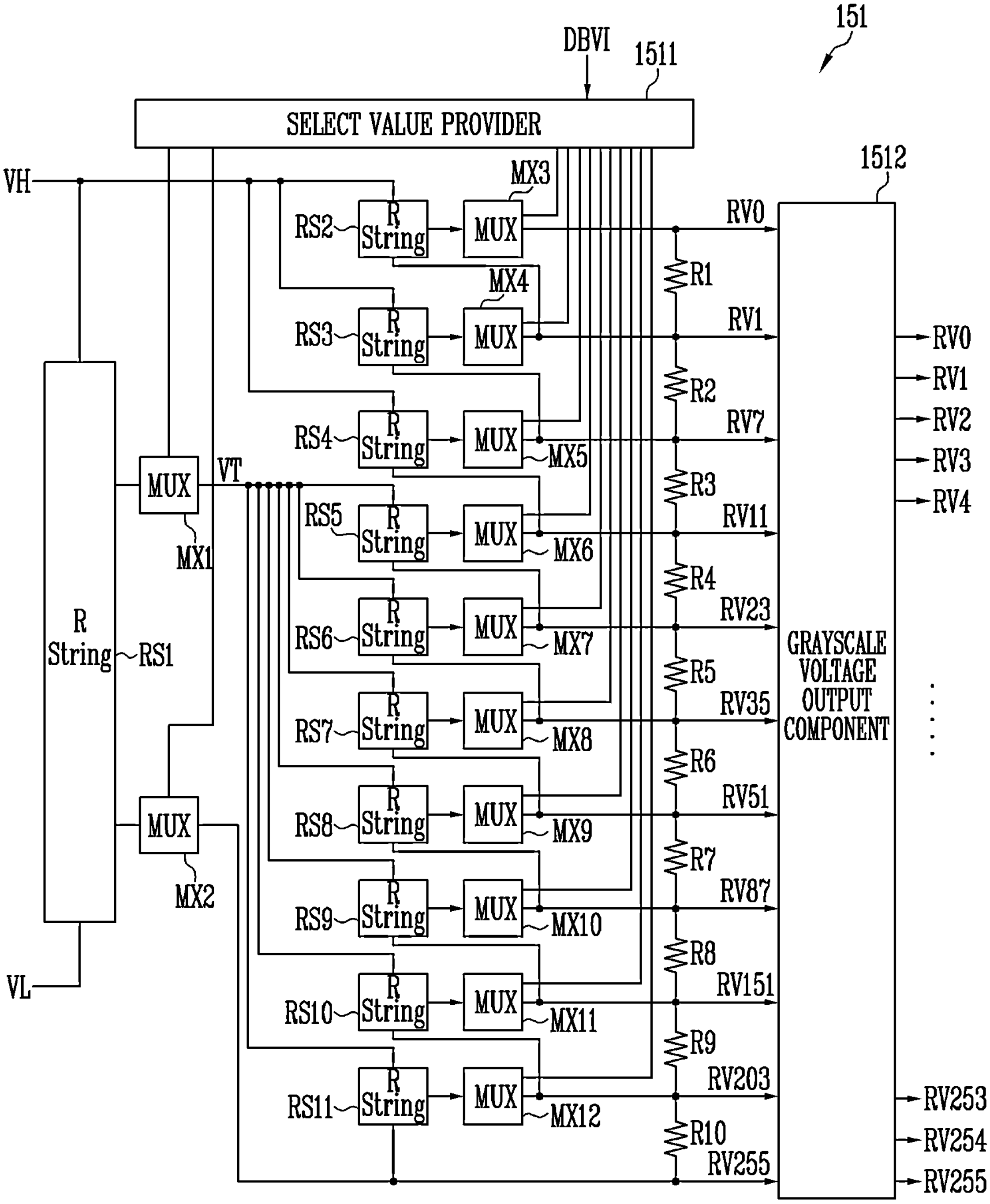
FIG. 5 is a diagram for describing an embodiment of a portion of the grayscale voltage generator of FIG. 4.

FIG. 5 is a diagram for describing an embodiment of a configuration of the grayscale voltage generator of FIG. 4.

Referring to FIG. 5, the first grayscale voltage generator 151 may include a select value provider 1511, a grayscale voltage output component 1512, resistor strings RS1 to RS11, multiplexers MX1 to MX12, and resistors R1 to R10.

The select value provider 1511 may provide select values for the multiplexers MX1 to MX12 in response to the maximum input luminance value DBVI. The select values in response to the maximum input luminance value DBVI may be stored in advance in a memory element, e.g., a register. The select values may differ from each other depending on the grayscale voltage generators 151, 152, and 153. Except the select values, the second grayscale voltage generator 152 and the third grayscale voltage generator 153 may have substantially the same configuration as that of the first grayscale voltage generator 151; therefore, repetitive explanation thereof will be omitted.

The resistor string RS1 may generate intermediate voltages between a first reference voltage VH and a second reference voltage VL. The multiplexer MX1 may select one of the intermediate voltages provided from the resistor string RS1 depending on the select value, and output a third reference voltage VT. The multiplexer MX2 may select one of the intermediate voltages provided from the resistor string RS1 depending on the select value, and output grayscale voltage 255 RV255.

The resistor string RS11 may generate intermediate voltages between the third reference voltage VT and grayscale voltage 255 RV255. The multiplexer MX12 may select one of the intermediate voltages provided from the resistor string RS11 depending on the select value, and output grayscale voltage 203 RV203.

The resistor string RS10 may generate intermediate voltages between the third reference voltage VT and grayscale voltage 203 RV203. The multiplexer MX11 may select one of the intermediate voltages provided from the resistor string RS10 depending on the select value, and output grayscale voltage 151 RV151.

The resistor string RS9 may generate intermediate voltages between the third reference voltage VT and grayscale voltage 151 RV151. The multiplexer MX10 may select one of the intermediate voltages provided from the resistor string RS9 depending on the select value, and output grayscale voltage 87 RV87.

The resistor string RS8 may generate intermediate voltages between the third reference voltage VT and grayscale voltage 87 RV87. The multiplexer MX9 may select one of the intermediate voltages provided from the resistor string RS8 depending on the select value, and output grayscale voltage 51 RV51.

The resistor string RS7 may generate intermediate voltages between the third reference voltage VT and grayscale voltage 51 RV51. The multiplexer MX8 may select one of the intermediate voltages provided from the resistor string RS7 depending on the select value, and output grayscale voltage 35 RV35.

The resistor string RS6 may generate intermediate voltages between the third reference voltage VT and grayscale voltage 35 RV35. The multiplexer MX7 may select one of the intermediate voltages provided from the resistor string RS6 depending on the select value, and output grayscale voltage 23 RV23.

The resistor string RS5 may generate intermediate voltages between the third reference voltage VT and grayscale voltage 23 RV23. The multiplexer MX6 may select one of the intermediate voltages provided from the resistor string RS5 depending on the select value, and output grayscale voltage 11 RV11.

The resistor string RS4 may generate intermediate voltages between the first reference voltage VH and grayscale voltage 11 RV11. The multiplexer MX5 may select one of the intermediate voltages provided from the resistor string RS4 depending on the select value, and output grayscale voltage 7 RV7.

The resistor string RS3 may generate intermediate voltages between the first reference voltage VH and grayscale voltage 7 RV7. The multiplexer MX4 may select one of the intermediate voltages provided from the resistor string RS3 depending on the select value, and output grayscale voltage 1 RV1.

The resistor string RS2 may generate intermediate voltages between the first reference voltage VH and grayscale voltage 1 RV1. The multiplexer MX3 may select one of the intermediate voltages provided from the resistor string RS2 depending on the select value, and output grayscale voltage 0 RV0.

Grayscale values 0, 1, 7, 11, 23, 35, 51, 87, 151, 203, and 255 may be also referred to as reference grayscale values. Furthermore, the grayscale voltages RV0, RV1, RV7, RV11, RV23, RV35, RV51, RV87, RV151, RRV203, and RV255 generated from the multiplexers MX2 to MX12 may be also referred to as reference grayscale voltages. The number of reference grayscale values and respective grayscale numbers corresponding to the reference grayscale values may be changed depending on products. Hereinafter, for convenience of description, the description will be made with grayscale values 0, 1, 7, 11, 23, 35, 51, 87, 151, 203, and 255 as reference grayscale values. The first grayscale voltage generator 151 may adjust a gamma curve by adjusting the magnitudes of the reference grayscale voltages. The user may customize the gamma curve to be suitable for purposes of the display device 10.

Figure 6:
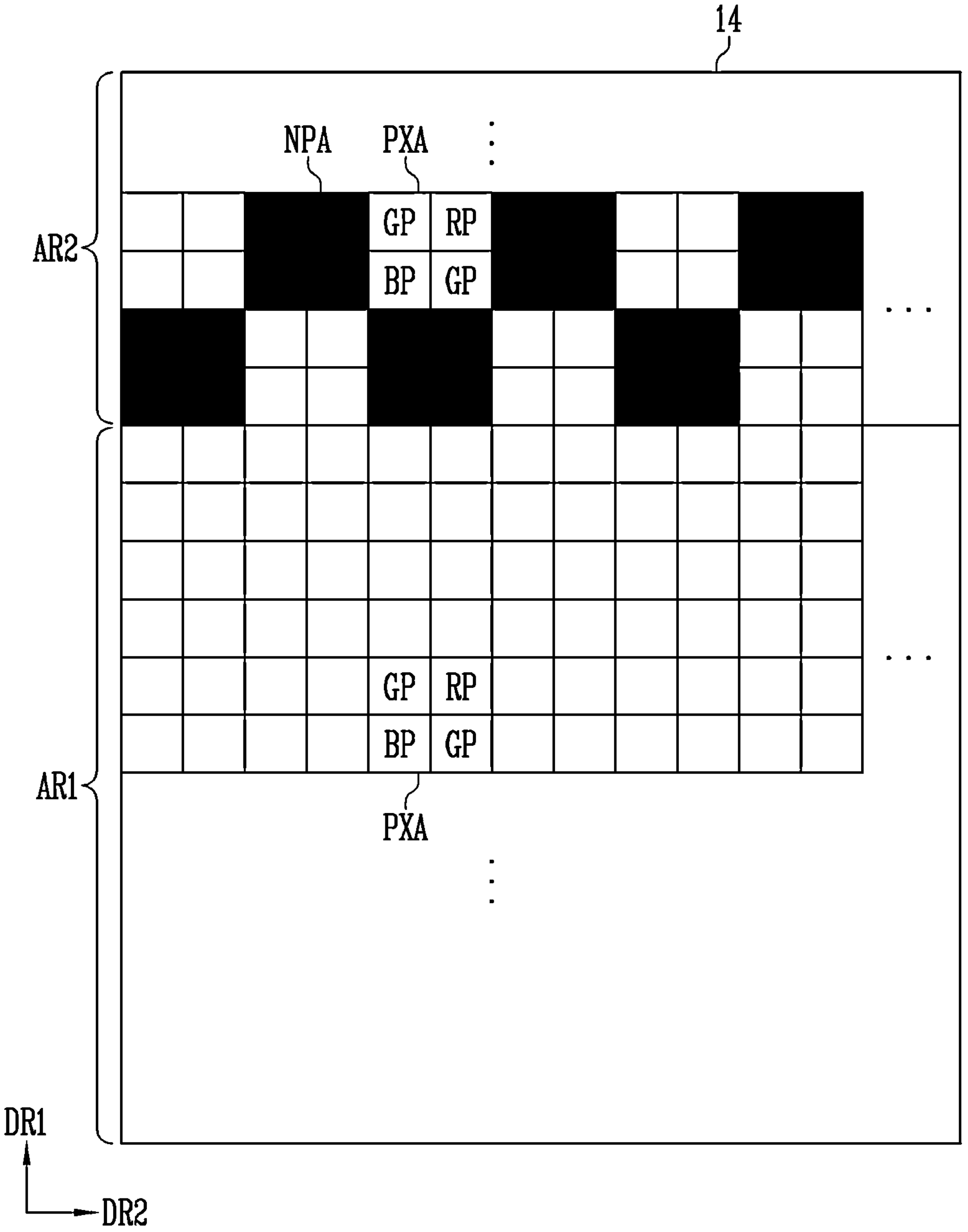
FIG. 6 is a diagram for describing an embodiment of a pixel component in accordance with the disclosure.

The grayscale voltage output component 1512 may divide reference grayscale voltages RV0, RV1, RV7, RV11, RV23, RV35, RV51, RV87, RV151, RV203, and RV255, thus generating divided grayscale voltages RV2 to RV6, RV8 to RV10, RV12 to RV22, RV24 to RV34, RV36 to RV50, RV52 to RV86, RV88 to RV150, RV152 to RV202, and RV204 to RV254. In an embodiment, the grayscale voltage output component 1512 may divide the reference grayscale voltages RV1 and RV7 to generate the grayscale voltages RV2 to RV6, for example. FIG. 6 is a diagram for describing an embodiment of the pixel component 14 in accordance with the disclosure.

In an embodiment, the pixel component 14 may include a display surface defined in a first direction DR1 and a second direction DR2 perpendicular to the first direction DR1, for example. Furthermore, the display surface of the pixel component 14 may have various shapes such as a circular shape, an elliptical shape, a quadrangular shape (e.g., a rhombus shape or a rectangular shape), or a triangular shape. In an embodiment, in the case where the display device 10 is a smart watch, it may be desirable that the pixel component 14 have a circular display surface, for example.

The pixel component 14 may include a first pixel area AR1 and a second pixel area AR2. In the first pixel area AR1, pixels (also referred to as first pixels) may be arranged at a first density. In the second pixel area AR2, pixels (also referred to as second pixels) may be arranged at a second density lower than the first density. In an embodiment, the first density may be two times the second density, for example. Here, the density may be a proportion of pixel disposition areas PXA per unit area. As the number of pixel disposition areas PXA per unit area is increased, the density is increased. As the number of non-pixel disposition areas NPA per unit area is increased, the density is reduced.

On the assumption that the pixel component 14 is configured in a PENTILE™ shape, FIG. 6 illustrates that the pixel disposition area PXA includes one first color pixel RP, two second color pixels GP, and one third color pixel BP. In an alternative embodiment, when the pixel component 14 is configured in an RGB stripe shape, the pixel disposition area PXA may include one first color pixel RP, one second color pixels GP, and one third color pixel BP, for example.

In an embodiment, the first pixel area AR1 may include only the pixel disposition areas PXA without including the non-pixel disposition area NPA, for example. In an embodiment, in the second pixel area AR2, the pixel disposition areas PXA and the non-pixel disposition areas NPA may be alternately disposed in the first direction DR1, for example. Furthermore, in the second pixel area AR2, the pixel disposition areas PXA and the non-pixel disposition areas NPA may be alternately disposed in the second direction DR2.

A sensor device such as a camera may be disposed under a lower surface (i.e., a surface opposite to the display surface) of the second pixel area AR2. In an embodiment, the camera may receive external light through the non-pixel disposition area NPA to perform an image capture function, for example.

Figure 7:
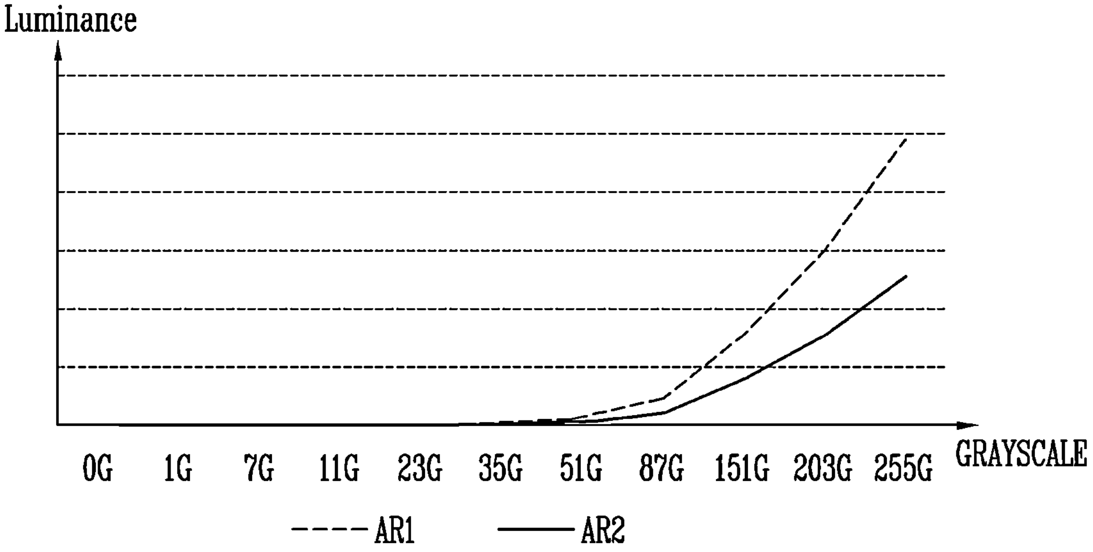
FIG. 7 is a diagram for describing a result of measuring respective luminances of pixel areas of the pixel component of FIG. 6 using a luminance meter.

FIG. 7 is a diagram for describing a result of measuring the luminances of the pixel areas of the pixel component 14 of FIG. 6 using a luminance meter.

Referring to FIG. 7, there is illustrated a luminance graph showing a result of measuring, using the luminance meter, the luminance of the first pixel area AR1 and the luminance of the second pixel area AR2 when the pixel component 14 is displayed at respective reference grayscale values 0G, 1G, 7G, 11G, 23G, 35G, 51G, 87G, 151G, 203G, and 255G. In an embodiment, the expression "the pixel component 14 is displayed at reference grayscale value 87G" may refer to the case where the grayscale value of each of the first color pixels, the second color pixels, and the third color pixels is 87, for example.

Under the same grayscale values, the luminance of the second pixel area AR2 may be lower than the luminance of the first pixel area AR1. The reason for this is because of the fact that the second density of the pixels of the second pixel area AR2 is lower than the first density of the pixels of the first pixel area AR1. Therefore, it is problematic in that a difference in luminance between the first pixel area AR1 and the second pixel area AR2 is visible to the user.

Figure 8:
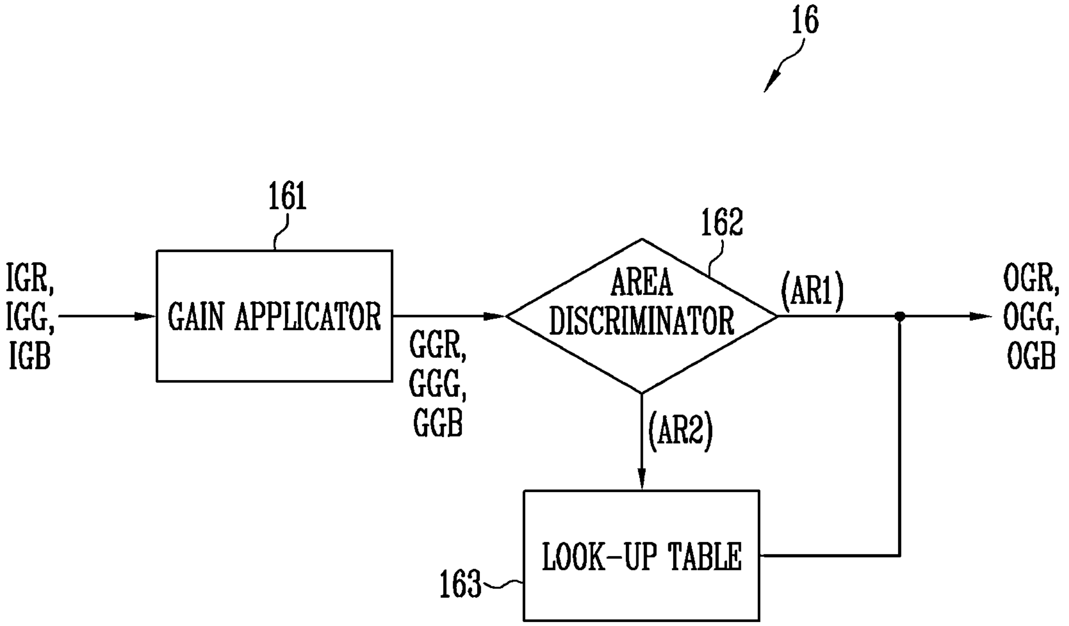
FIG. 8 is a diagram for describing an embodiment of a grayscale compensator in accordance with the disclosure.

FIG. 8 is a diagram for describing an embodiment of the grayscale compensator 16 in accordance with the disclosure. FIG. 9 is a diagram for describing an embodiment of a look-up table 163 in accordance with the disclosure.

The grayscale compensator 16 may convert input grayscale values IGR, IGG, and IGB for the first pixel area AR1 to output grayscale values OGR, OGG, and OGB within a first grayscale range, and may convert input grayscale values IGR, IGG, and IGB for the second pixel area AR2 to output grayscale values OGR, OGG, and OGB within a second grayscale range. Here, an upper limit of the second grayscale range may be greater than an upper limit of the first grayscale range. In an embodiment, the second grayscale range may be greater than the first grayscale range, for example. In an embodiment, the second grayscale range may include the first grayscale range, for example.

Referring to FIG. 8, the grayscale compensator 16 in an embodiment of the disclosure may include a gain applicator 161, an area discriminator 162, and a look-up table 163.

The gain applicator 161 may apply a gain to the input grayscale values IGR, IGG, and IGB and generate gain-applied grayscale values GGR, GGG, and GGB which are lower than the input grayscale values IGR, IGG, and IGB. In an embodiment, the input grayscale values IGR, IGG, and IGB may include first input grayscale values IGR for the first color, second input grayscale values IGG for the second color, and third input grayscale values IGB for the third color, for example. The gain-applied grayscale values GGR, GGG, and GGB may include first gain-applied grayscale values GGR for the first color, second gain-applied grayscale values GGG for the second color, and third gain-applied grayscale values GGB for the third color.

In an embodiment, the gain may be greater than 0 and lower than 1. The expression "applying a gain" may refer to the expression "multiplying the gain", for example. The gain applicator 161 may adjust the ranges of the output grayscale values OGR, OGG, and OGB by adjusting the size of the gain. In an embodiment, when the ranges of the output grayscale values OGR, OGG, and OGB are excessively large, the number of bits desired to represent the output grayscale values OGR, OGG, and OGB may be unnecessarily increased, for example.

In an embodiment, the gain applicator 161 may apply the same gain to the first input grayscale values IGR, the second input grayscale values IGG, and the third input grayscale values IGB, for example. In an embodiment, the gain applicator 161 may apply, in common, a gain of 0.8 to the input grayscale values IGR, IGG, and IGB, thus generating gain-applied grayscale values GGR, GGG, and GGB, for example.

The area discriminator 162 may determine whether the gain-applied grayscale values GGR, GGG, and GGB are grayscale values corresponding to the first pixel area AR1 or grayscale values corresponding to the second pixel area AR2. The grayscale compensator 16 may provide output grayscale values OGR, OGG, and OGB which are the same as the gain-applied grayscale values GGR, GGG, and GGB in the case where the gain-applied grayscale values GGR, GGG, and GGB correspond to the first pixel area AR1, and may provide output grayscale values OGR, OGG, and OGB based on the look-up table 163 in the case where the gain-applied grayscale values GGR, GGG, and GGB correspond to the second pixel area AR2. The output grayscale values OGR, OGG, and OGB may include first output grayscale values OGR for the first color, second output grayscale values OGG for the second color, and third output grayscale values OGB for the third color. The grayscale compensator 16 may independently perform processes of converting the input grayscale values IGR, IGG, and IGB, the gain-applied grayscale values GGR, GGG, and GGB, and the output grayscale values OGR, OGG, and OGB for each color.

The look-up table 163 may define a relationship of the output grayscale values OGR, OGG, and OGB to the gain-applied grayscale values GGR, GGG, and GGB. In an embodiment, the look-up table 163 may be set such that, when preset gain-applied grayscale values GGR, GGG, and GGB are inputted, preset output grayscale values OGR, OGG, and OGB are outputted, for example.

The look-up table 163 may define the first output grayscale values OGR for the first gain-applied grayscale values GGR, the second output grayscale values OGG for the second gain-applied grayscale values GGG, and the third output grayscale values OGB for the third gain-applied grayscale values GGB. The look-up table 163 may be in a state in which, among fields FI1, FI2, and FI3 of FIG. 9, data of only a first field FI1 and a third field FI3 are recorded in a memory. The second field FI2 may be an intermediate process for obtaining the third field FI3, and may not be stored in the look-up table 163. The first output grayscale values OGR, the second output grayscale values OGG, and the third output grayscale values OGB may be different from each other.

Hereinafter, a process of producing the data of FIG. 9 will be described. The foregoing process may be performed by an external computing device and an external luminance meter without the operation of the grayscale compensator 16 before the look-up table 163 is made.

The data of the first field FI1 may be gain-applied grayscale values GGR, GGG, and GGB obtained by applying a gain to the input grayscale values IGR, IGG, and IGB. In an embodiment, a first gain-applied grayscale value GGR of 69.6 may be computed by multiplying a first input grayscale value IGR of 87 by a gain of 0.8, for example. Likewise, remaining first gain-applied grayscale values GGR, second gain-applied grayscale values GGG, and third grain-applied grayscale values GGB may be computed.

The data of the second field FI2 may include first ratios RatioR, second ratios RatioG, and third ratios RatioB. Each of the ratios RatioR, RatioG, and RatioB may be a value obtained by dividing the luminance of the first pixel area AR1 that is measured on the corresponding gain-applied grayscale value GGR, GGG, GGB by the luminance of the second pixel area AR2. In an embodiment, in the case where the display device 10 displays an image including a first color of grayscale value 69.6, a second color of grayscale value 69.6, and a third color of grayscale value 69.6, a first luminance of the first pixel area AR1 and a second luminance of the second pixel area AR2 may be measured by the luminance meter, for example. Here, a value obtained by dividing a first color value of the first luminance by a first color value of the second luminance may be a first ratio RatioR and be 1.97. A value obtained by dividing a second color value of the first luminance by a second color value of the second luminance may be a second ratio RatioG and be 1.96. A value obtained by dividing a third color value of the first luminance by a third color value of the second luminance may be a third ratio RatioB and be 1.89. Likewise, remaining first ratios RatioR, second ratios RatioG, and third ratios RatioB may be computed.

The data of the third field FI3 may be computed by multiplying the data of the first filed FI1 by the corresponding data of the second field FI2. In an embodiment, a first output grayscale value OGR of 137.09 may be computed by multiplying the first gain-applied grayscale value GGR of 69.9 by the first ratio RatioR of 1.97, for example. Likewise, remaining first output grayscale values OGR, second output grayscale values OGG, and third output grayscale values OGB may be computed. Here, in the second field FI2 of FIG. 9, the numbers are rounded off to two decimal places, so that there may be a calculation error of the output grayscale values OGR, OGG, and OGB.

The look-up table 163 may define the relationship of only input-defined grayscale values (e.g., 0.8, 5.6, 8.8, 18.4, 28, 40.8, 69.6, 120.8, 162.4, and 204 of FIG. 9) that are some of the gain-applied grayscale values GGR, GGG, and GGB to the output grayscale values OGR, OGG, and OGB. The relationship-defined output grayscale values OGR, OGG, and OGB may be also referred to as output-defined grayscale values. It is inappropriate to write definition of all of the gain-applied grayscale values GGR, GGG, and GGB in the look-up table 163, because the cost of the memory is increased. Therefore, it is desirable that the relationship of only the input-defined grayscale values corresponding to the reference grayscale values (refer to the description of FIG. 5) used to define the gamma curve to the output grayscale values OGR, OGG, and OGB be defined.

The grayscale compensator 16 may generate output grayscale values for the gain-applied grayscale values GGR, GGG, and GGB except the input-defined grayscale values by performing an interpolation operation using the look-up table 163. In an embodiment, with regard to a first gain-applied grayscale value GGR of 110 for the second pixel area AR2, a first output grayscale value OGR may be computed by interpolating 234.61 and 137.09.

The number of bits of each of the output grayscale values OGR, OGG, and OGB of the grayscale compensator 16 may be greater than the number of bits of each of the input grayscale values IGR, IGG, and IGB. In an embodiment, when each of the input grayscale values IGR, IGG, and IGB includes 8 bits, each of the output grayscale values OGR, OGG, and OGB may include 10 bits, for example. Some of the bits that constitute the output grayscale values OGR, OGG, and OGB may be used to represent numbers in the decimal places.

Figure 10:
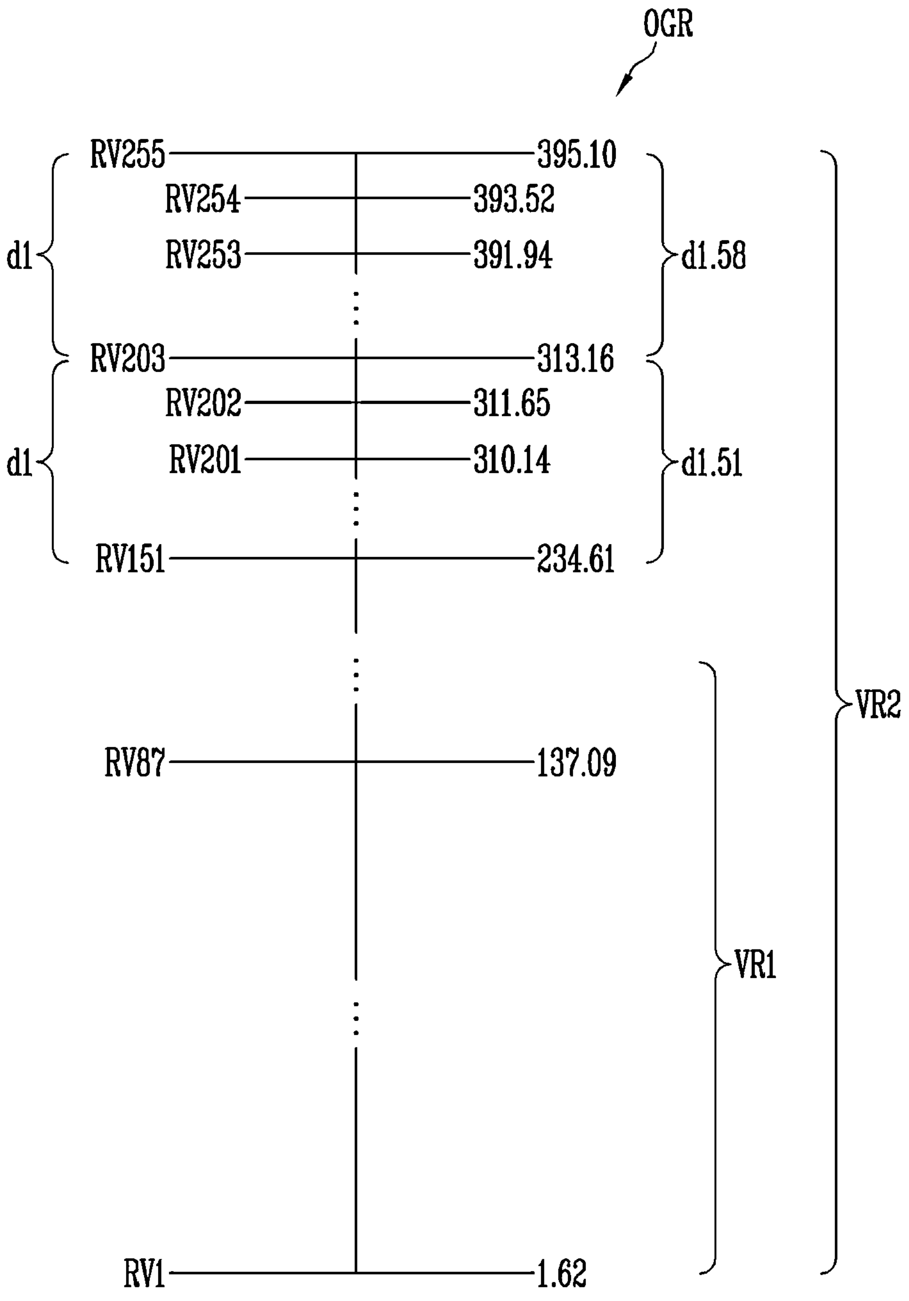
FIG. 10 is a diagram for describing an embodiment of a relationship between output grayscale values and grayscale voltages in accordance with the disclosure.

FIG. 10 is a diagram for describing an embodiment of a relationship between the output grayscale values and the grayscale voltages in accordance with the disclosure.

As described above, the second grayscale range of the output grayscale values OGR, OGG, and OGB for the second pixel area AR2 may be greater than the first grayscale range of the output grayscale values OGR, OGG, and OGB for the first pixel area AR1. Therefore, a second voltage range VR2 to be used in the second pixel area AR2 among the grayscale voltages RV0 to RV255, GV0 to GV255, and BV0 to BV25 which are generated from the grayscale voltage generator 15 is desired to be greater than a first voltage range VR1 to be used in the first pixel area AR1. In an embodiment, a maximum value of the second voltage range VR2 may be greater than that of the first voltage range VR1, for example. A minimum value of the second voltage range VR2 may be the same as that of the first voltage range VR1. Although, in FIG. 10, the first color is described by way of example, the same description may be applied to the second color and the third color.

In an embodiment, the data driver 12 may provide the reference grayscale voltages RV1, . . . . RV87, RV151, RV203, and RV255 as data voltages for the output-defined grayscale values (e.g., 1.62, . . . , 137.09, 234.61, 313.16, and 395.10 that are the first output grayscale values OGR of FIG. 9) defined in the look-up table 163. Here, although the first grayscale voltages RV1 to RV255 may be defined with a constant grayscale interval d1 defined between adjacent first grayscale voltages, the first output grayscale values OGR may be defined with a plurality of grayscale intervals d1.58, and d1.51 each of which is defined between adjacent first output grayscale values.

The first output grayscale values OGR that do not correspond to the first grayscale voltages RV1 to RV255 among the first output grayscale values OGR may be represented by dithering. In an embodiment, with regard to the first output grayscale value OGR of 392, a data voltage related to the grayscale voltage RV254 corresponding to 393.52 is supplied to the corresponding pixel, and an emission period of the corresponding pixel is reduced so that the first output grayscale value OGR of 392 may be represented, for example. The first output grayscale value OGR may also be represented to match an average grayscale value of adjacent pixels.

In an embodiment, the display device 10 may include a grayscale voltage generator capable of producing grayscale voltages for grayscale values of 9 bits or more. In an embodiment, the grayscale voltage generator may have specifications capable of generating 512 grayscale voltages for grayscale values of 9 bits, for example. In the case where the output grayscale values OGR, OGG, and OGB are integers, grayscale voltages may be provided as data voltages. In the case where the output grayscale values OGR, OGG, and OGB are decimals, an additional dithering operation may be performed.

In a display device and a method of driving the display device in an embodiment, pixel areas which differ in layout of pixels from each other may emit light at the same luminance on the same input grayscale values.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims. Accordingly, the bounds and scope of the disclosure should be determined by the technical spirit of the following claims.

What is claimed is:

1. A display device comprising:

a pixel component including:

a first pixel area in which first pixels are disposed at a first density, the first density defined by a proportion of a pixel disposition area of the first pixels per unit area; and a second pixel area in which second pixels are disposed at a second density lower than the first density, the second density defined by a proportion of a pixel disposition area of the second pixels per unit area, and a grayscale voltage generator which provides grayscale voltages for the first pixel area within a first voltage range, and provides the grayscale voltages for the second pixel area within a second voltage range, wherein the second voltage range is wider than the first voltage range, wherein a minimum value of the second voltage range is the same as a minimum value of the first voltage range, and wherein a maximum value of the second voltage range is greater than a maximum value of the first voltage range.

2. The display device according to claim 1, further comprising a grayscale compensator which converts input grayscale values for the first pixel area to output grayscale values within a first grayscale range, converts the input grayscale values for the second pixel area to the output grayscale values within a second grayscale range, wherein an upper limit of the second grayscale range corresponding to the second voltage range is greater than an upper limit of the first grayscale range corresponding to the first voltage range, and wherein the grayscale compensator comprises a gain applicator which applies a gain to the input grayscale values and generates gain-applied grayscale values lower than the input grayscale values.

3. The display device according to claim 2, wherein the grayscale compensator further comprises an area discriminator which determines whether the gain-applied grayscale values are grayscale values corresponding to the first pixel area or grayscale values corresponding to the second pixel area.

4. The display device according to claim 3, wherein the grayscale compensator further comprises a look-up table which defines a relationship between the output grayscale values and the gain-applied grayscale values.

5. The display device according to claim 4, wherein the grayscale compensator provides the output grayscale values identical to the gain-applied grayscale values in a case in which the gain-applied grayscale values correspond to the first pixel area, and provides the output grayscale values based on the look-up table in a case in which the gain-applied grayscale values correspond to the second pixel area.

6. The display device according to claim 5, wherein the input grayscale values include first input grayscale values for a first color, second input grayscale values for a second color, and third input grayscale values for a third color, and wherein the gain applicator applies an identical gain to the first input grayscale values, the second input grayscale values, and the third input grayscale values.

7. The display device according to claim 6, wherein the gain-applied grayscale values include first gain-applied grayscale values for the first color, second gain-applied grayscale values for the second color, and third gain-applied grayscale values for the third color, wherein the output grayscale values include first output grayscale values for the first color, second output grayscale values for the second color, and third output grayscale values for the third color, wherein the look-up table defines the first output grayscale values for the first gain-applied grayscale values, the second output grayscale values for the second gain-applied grayscale values, and the third output grayscale values for the third gain-applied grayscale values, and wherein the first output grayscale values, the second output grayscale values and the third output grayscale values are different from each other.

8. The display device according to claim 4, wherein the look-up table defines the output grayscale values only for input-defined grayscale values which are a portion of the gain-applied grayscale values, and wherein the grayscale compensator generates the output grayscale values for the gain-applied grayscale values other than the input-defined grayscale values by performing an interpolation operation using the look-up table.

9. The display device according to claim 8, wherein the grayscale voltage generator provides the grayscale voltages corresponding to the output grayscale values, and wherein the grayscale voltages include reference grayscale voltages for reference grayscale values, and divided grayscale voltages generated by dividing the reference grayscale voltages.

10. The display device according to claim 9, wherein the input-defined grayscale values of the look-up table correspond to the reference grayscale values.

11. An electronic device comprising:

a processor which provides input grayscale values for an image frame; and a display device which displays an image based on the input grayscale values, the display device comprising a pixel component and a grayscale voltage generator, wherein the pixel component comprises:

a first pixel area in which first pixels are disposed at a first density, the first density defined by a proportion of a pixel disposition area of the first pixels per unit area; and a second pixel area in which second pixels are disposed at a second density lower than the first density, the second density defined by a proportion of a pixel disposition area of the second pixels per unit area, wherein the grayscale voltage generator provides grayscale voltages for the first pixel area within a first voltage range, and provides the grayscale voltages for the second pixel area within a second voltage range, wherein the second voltage range is wider than the first voltage range, wherein a minimum value of the second voltage range is the same as a minimum value of the first voltage range, and wherein a maximum value of the second voltage range is greater than a maximum value of the first voltage range.

12. The electronic device according to claim 11, wherein the display device further comprises a grayscale compensator which converts the input grayscale values for the first pixel area to output grayscale values within a first grayscale range, converts the input grayscale values for the second pixel area to the output grayscale values within a second grayscale range, wherein an upper limit of the second grayscale range corresponding to the second voltage range is greater than an upper limit of the first grayscale range corresponding to the first voltage range, and wherein the grayscale compensator comprises a gain applicator which applies a gain to the input grayscale values and generates gain-applied grayscale values lower than the input grayscale values.

13. The electronic device according to claim 12, wherein the grayscale compensator further comprises an area discriminator which determines whether the gain-applied grayscale values are grayscale values corresponding to the first pixel area or grayscale values corresponding to the second pixel area.

14. The electronic device according to claim 13, wherein the grayscale compensator further comprises a look-up table which defines a relationship between the output grayscale values and the gain-applied grayscale values.

15. The electronic device according to claim 14, wherein the grayscale compensator provides the output grayscale values identical to the gain-applied grayscale values in a case in which the gain-applied grayscale values correspond to the first pixel area, and provides the output grayscale values based on the look-up table in a case in which the gain-applied grayscale values correspond to the second pixel area.

16. The electronic device according to claim 15, wherein the input grayscale values include first input grayscale values for a first color, second input grayscale values for a second color, and third input grayscale values for a third color, and wherein the gain applicator applies an identical gain to the first input grayscale values, the second input grayscale values, and the third input grayscale values.

17. The electronic device according to claim 16, wherein the gain-applied grayscale values include first gain-applied grayscale values for the first color, second gain-applied grayscale values for the second color, and third gain-applied grayscale values for the third color, wherein the output grayscale values include first output grayscale values for the first color, second output grayscale values for the second color, and third output grayscale values for the third color, wherein the look-up table defines the first output grayscale values for the first gain-applied grayscale values, the second output grayscale values for the second gain-applied grayscale values, and the third output grayscale values for the third gain-applied grayscale values, and wherein the first output grayscale values, the second output grayscale values and the third output grayscale values are different from each other.

18. The electronic device according to claim 14, wherein the look-up table defines the output grayscale values only for input-defined grayscale values which are a portion of the gain-applied grayscale values, and wherein the grayscale compensator generates the output grayscale values for the gain-applied grayscale values other than the input-defined grayscale values by performing an interpolation operation using the look-up table.

19. The electronic device according to claim 18, wherein the grayscale voltage generator provides the grayscale voltages corresponding to the output grayscale values, and wherein the grayscale voltages include reference grayscale voltages for reference grayscale values, and divided grayscale voltages generated by dividing the reference grayscale voltages.

20. The electronic device according to claim 19, wherein the input-defined grayscale values of the look-up table correspond to the reference grayscale values.

* * * * *